B. L. SIMS.
Plow Attachment.
No. 225,079. Patented Mar. 2, 1880.
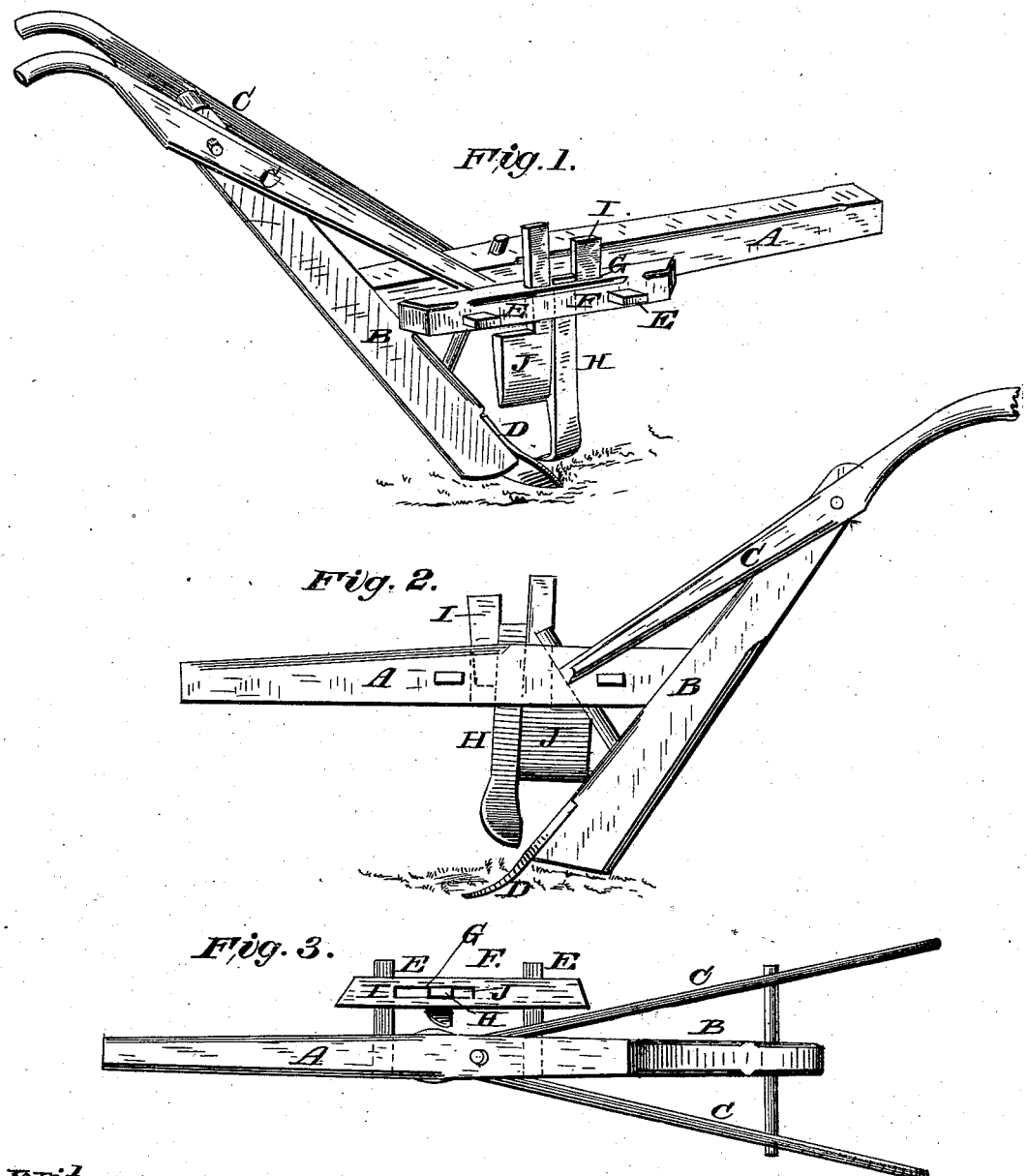

UNITED STATES PATENT OFFICE.

BENJAMIN L. SIMS, OF GREENVILLE, GEORGIA.

PLOW ATTACHMENT.

SPECIFICATION forming part of Letters Patent No. 225,079, dated March 2, 1880.

Application filed December 27, 1879.

*To all whom it may concern:*

Be it known that I, BENJAMIN L. SIMS, of Greenville, in the county of Meriwether and State of Georgia, have invented certain new and useful Improvements in Plow Attachments; and I do hereby declare that the following is a full, clear, and exact description of the invention, which will enable others skilled in the art to which it appertains to make and use the same, reference being had to the accompanying drawings, which form a part of this specification.

Figure 1 is a perspective view; Fig. 2 is a side view, and Fig. 3 is a top view.

Corresponding parts in the several figures are denoted by like letters of reference.

This invention relates to an improved attachment for plows and cultivators, the nature and construction of which will be hereinafter fully described with reference to the drawings, in which—

A is the beam, B the standard, and C C the handles, of a plow, D, in the construction of which no novelty is claimed.

The beam A is provided with two laterally-projecting arms, E E, supporting a beam or bracket, F, which slides laterally upon said arms, so as to be adjustable at any desired distance from the beam A.

The bracket F is provided with a vertical slot or mortise, G, to accommodate the shank of an attachment, H, which I term the "trimmer," and which consists of a curved knife-edged cutter adapted to cut grass, weeds, &c., away from the young growing plants and throw them over toward the plow. Immediately behind the trimmer is adjusted a guard, J, which may be lowered to prevent the soil disturbed by the progress of the plow from reaching the tender plants, or it may be adjusted at any desired height, thus causing any desired quantity of the soil to fall gently toward the growing plants. The trimmer and guard are secured in position by a wedge, I.

The advantages of my invention for cultivating corn and cotton crops will be readily understood. For thinning cotton it may be used with especial advantage. It is simple, inexpensive, and may be readily attached to the beam of any ordinary plow or cultivator.

Having thus described my invention, I claim and desire to secure by Letters Patent of the United States—

The combination of the plow-beam A, having arms E E, adjustable bracket F, having mortise G, trimmer H, guard J, and wedge I, all constructed, combined, and operating substantially as and for the purpose set forth.

In testimony that I claim the foregoing as my own I have hereto affixed my signature in presence of two witnesses.

BENJAMIN L. SIMS.

Witnesses:
THOMAS W. GILL,
JOHN T. WOODARD.